United States Patent [19]

Pardo et al.

[11] 4,047,448

[45] Sept. 13, 1977

[54] ROBOT HEAD

[75] Inventors: Pierre Pardo; Francois C. Pruvot, both of Meudon la Foret, France

[73] Assignee: SOFERMO, Meudon la Foret, France

[21] Appl. No.: 685,927

[22] Filed: May 12, 1976

[30] Foreign Application Priority Data

May 15, 1975 France .................................. 75.15127

[51] Int. Cl.² .............................................. F16H 1/14
[52] U.S. Cl. ................................... 74/417; 214/1 CM
[58] Field of Search ............... 74/417, 416; 214/1 CM

[56] References Cited

U.S. PATENT DOCUMENTS

| | | | |
|---|---|---|---|
| 2,861,699 | 11/1958 | Youmans | 214/1 CM |
| 3,784,031 | 1/1974 | Niitu et al. | 214/1 CM X |
| 3,866,966 | 2/1975 | Skinner | 214/1 CM X |
| 3,985,238 | 10/1976 | Nakura et al. | 74/417 X |

*Primary Examiner*—Edgar W. Geoghegan

*Attorney, Agent, or Firm*—Fleit & Jacobson

[57] ABSTRACT

Head for a robot or manipulator comprising a control casing and at least two shafts perpendicular to each other, with corresponding external members rotatably driven from separate control servo motors, one shaft being rigid with one of said members which supports the other shaft, said servo motors are fixedly mounted in said casing so as to drive at least two coaxial shafts, while the driving of at least one of said perpendicular shafts from one of said coaxial shafts takes place through a bevel gear of which the input pinion is rigid with this one coaxial shaft and the output pinion is rigid with the shaft concerned.

This head construction permits assembling the servo motors into a readily accessible unit by providing said coaxial shafts with concentric toothed members in meshing engagement with driving pinion driven in turn from said servo motors, and is applicable notably to robot heads having two or three degrees of freedom.

7 Claims, 4 Drawing Figures

ROBOT HEAD

The present invention relates to a head for robots or manipulators comprising at least two axes of rotation perpendicular to each other.

Many robots have already been proposed which have the essential characteristic of forming a unitary compact structure.

Thus, for instance, a manipulator adapted to be programmed, well known in the art, comprises a manipulating arm, means for moving said arm along several different axes, means for producing a digital control signal defining the desired arm position, wherein the motion control means comprise hydraulic actuators and servo-distributors controlling said actuators, said hydraulic actuators comprising in turn a hydraulic cylinder connected to said arm so as to move same along a predetermined axis, a main slide valve and a monitoring slide valve disposed concentrically, conduit means connecting said main slide valve to the two ends of said cylinder, means providing an annular gap concentric to said monitoring slide valve, a coil disposed in said gap and connected to said monitoring slide valve, and means delivering unidirectional electric current to said coil for driving said monitoring slide valve in the proper direction.

On the other hand, a known commercial manipulator robot comprising an arm mechanism with multiple joints or pivotal connections is also known, wherein at least two separate arms, namely a main arm and an auxiliary arm, can be moved in a common plane, the main arm being coupled in a fixed manner at its rear end to another or second shaft coupled to a motor, whereby the main arm can be rotated about the axis of said second shaft, said auxiliary arm being coupled in a fixed manner at its rear end to a third shaft mounted for rotation to the front or outer end of said main arm, whereby the auxiliary arm can rotate about the axis of said third shaft, and that a sun toothed wheel is in meshing engagement with a planet wheel mounted for rotation about a fixed shaft disposed at a suitable location along said main arm, an intermediate toothed wheel being mounted for rotation on said fixed shaft and fixedly coupled to said planet wheel so as to rotate bodily therewith, and that a transmission toothed wheel fixedly mounted to said third shaft is coupled by meshing engagement with said intermediate toothed wheel whereby said second and third shafts are coupled to each other through an epicyclic gear for the extension movement consisting of the afore-mentioned toothed wheels, the gear ratio of these toothed wheels being selected to comply with the relationship $t_2 \times t_4 / t_1 \times t_3 = 2$, wherein $t_4$, $t_3$, $t_2$ and $t_1$ designate the number of teeth carried by said toothed wheels, respectively, taken in the order of this description, whereby, when power is transmitted to the second shaft, the main arm 15 caused to tilt upwardly or downwardly about the axis of the second shaft while the auxiliary arm can be caused to tilt upwardly or downwardly, or in the opposite direction, i.e. downwardly or upwardly, through an equal angle in their common plane.

Another known robot designed more particularly for the remote-controlled automatic manipulation of miscellaneous objects for feeding or discharging machines, comprises in combination on the one hand a substructure consisting of a fixed assembly and of a rotary stand incorporating the various driving units, whether electrical, pneumatic or hydraulic, responsive to electronic control units, and on the other hand a superstructure connected through a cradle to said substructure and comprising a movable arm, a wrist and a pair of pincers or tongs, this superstructure being provided with several kinematic units for spreading the arm to a rectilinear configuration, lifting or lowering the arm end, oscillating and rotating the wrist and operating the pincers or tongs, some of these kinematic assemblies being provided in turn with compensating means.

As a rule, these robot manipulators are bulky and complicated. They are not of the self-operating type that can easily be re-used in other systems. The considerable number of component elements, the length of the kinematic chains are such that the corresponding apparatus lack both precision and rigidity, as required for fast-operating robots designed for accomplishing certain operations at a high repetition rate. Furthermore, their cost is prohibitive.

It is the essential object of the present invention to avoid these inconveniences.

The head for a robot or manipulator according to this invention, which comprises a control casing and at least two perpendicular shafts and corresponding external members rotatably driven from control servo motors, one of said perpendicular shafts being rigid with one of said members supporting the other perpendicular shaft, is characterised in that the servo motors mounted in a fixed position in said control casing drive at least two coaxial shafts and that at least one of said shafts from one of said coaxial shafts is driven through a bevel gear, the input pinion of said bevel gear being rigid with said one coaxial shaft while the output pinion is rigid with said one perpendicular shaft.

More particularly, this invention permits assembly into a compact unit, and facilitates the access to, the servo motors by providing on said coaxial shafts concentric toothed wheels in constant driving engagement with driving pinions driven in turn by said servo motors.

With this arrangement, robot heads having two and even three degrees of freedom, i.e. three axes of rotation, may be constructed, as will be explained hereinafter, under a relatively reduced volume, so that the assembly can be mounted on any machine or device requiring an apparatus capable of providing two or three degrees of freedom. These constructions may be of the modular type, so that a head providing two or three axes of rotation will not be more expensive than the corresponding head specially developed for the purpose.

The head according to the present invention is particularly simple and due to the small number of component elements required these can have relatively small dimensions and therefore a high degree of rigidity, and operate with extremely reduced clearances. Moreover, the motors and the position coding units or devices possibly required and associated with said motors are located very close to the driven shaft, so that this head will constitute a high-precision device in spite of its low production cost.

The use of rotary motors does not limit the desired angle of rotation of said perpencidular shafts.

Other features and advantages characterising this invention will appear as the following description proceeds with reference to the accompanying drawings illustrating diagrammatically by way of example typical forms of embodiment of the invention. In the drawings.

Figure 1:
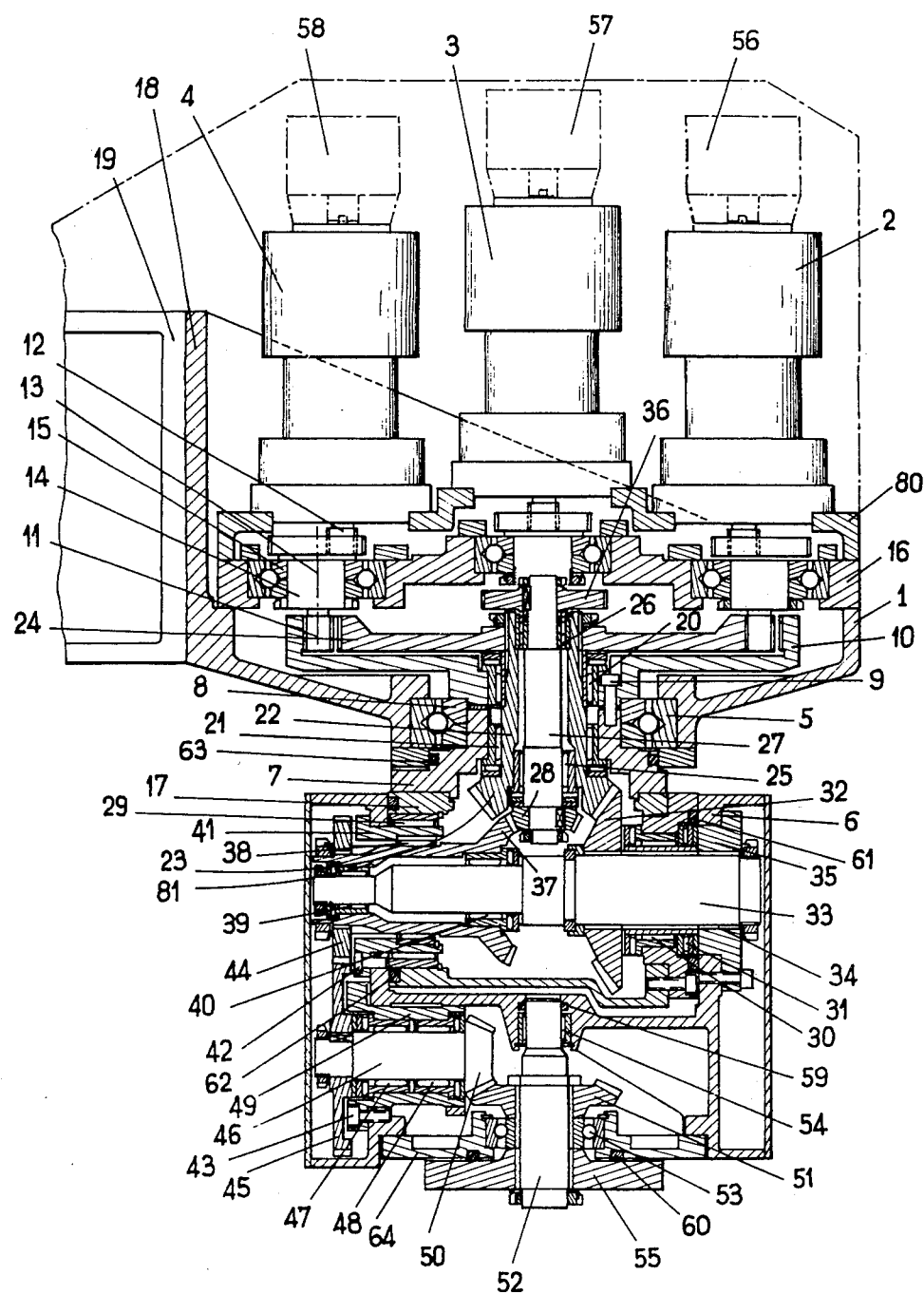
FIG. 1 is a developed vertical sectional view taken along the longitudinal center line of a first form of embodiment of a robot or manipulator head having three axes, according to this invention.

Referring first to the form of embodiment illustrated in FIG. 1, the head for a robot or manipulator comprises a control or main casing 1 of substantially tapered configuration, which comprises a cover plate 80 supporting three hydraulic powered rotary motors 2, 3 and 4 driving separately the head shafts, respectively.

Fitted in the bottom portion of this casing 1 is a rolling-contact bearing 5 having four contact points for the pivotal or swivel mounting of a cylindrical depending casing 17 having an extension within the control or main casing 1, said extension consisting of a tubular body 7 locked in a twin inner race 8 of bearing 5 by means of screws 9 locking in position at the same time an internally toothed annulus 10. The axis of bearing 5, 8 constitutes the first rotational axis of the head and is materialized by a vertical shaft 27.

The inner teeth of the annulus are in constant meshing engagement with a matching pinion 11 rigid with a driving shaft 12 driven from a motor via a reduction gear 13 comprising in this case said pinion 11, and a shaft 14 locked in an inner race 15 of another four contact-point bearing secured in turn in an annular plate 16 disposed between said casing 1 and its cover plate 80. The tubular body 7 is thus adapted rotatably to drive the cylindrical depending casing 17 to which it is rigidly fastened by conventional means (not shown).

The casing 1 comprises a lateral assembling wall 18 for mounting the casing to the end for example of a robot arm 19. A coaxial shaft 22 is rotatably mounted within the tubular body 7 and toothed annulus 10 through the intermediary of a pair of needle bearings 20 and 21. This coaxial shaft 22 carries at its lower end a bevel pinion 23 housed withing the casing 17 and at its upper end an externally toothed annular member 24 concentric to the internally toothed annulus 10 and driven from the rotary motor 2 via means similar to those described hereinabove in connection with the transmission from motor 4 to drive shaft 12.

Concentrically to and within said shaft 22 is a third shaft 27 mounted by means of a pair of bearings 25 and 26. This third shaft 27 is rotatably driven from the rotary motor 3 (mounted like motors 4 and 2, and parallel thereto) via a pinion 36 and another pinion driving this pinion 36 but not shown in the figure. At the ooposite end of shaft 27 a bevel pinion 28 is mounted in such a manner that the apex of the pitch cone of pinion 28 merges into the apex of the pitch cone of bevel pinion 23.

This head further comprises a casing 6 detachably mounted in said casing 17.

The bevel pinion 23 is in constant meshing engagement with a bevel pinion 32 mounted in a conventional manner on a shaft 33 constituting the second axis of the robot head. This shaft 33 is centered radially and mounted axially in the casing 17 by means of bearings 30 and 31. The shaft 33 comprises longitudinal external splines 34 engaged at one end by the driving bevel pinion 32 and at the opposite end by an internally splined ring 35 rigidly secured to said inner casing 6 so as to rotatably drive the latter about the shaft 33 when said bevel pinion 32 is rotatably driven from the motor 2.

The lower bevel pinion 28 rotatably drives another shaft 81 carrying another axially disposed bevel pinion 37 centered to the splined shaft 33 by means of bearings 38 and 39. The shaft 81 is also centered by a bearing 40 locked in a ring 41 retained in position by screws 42 and centered in the casing 6. This ring 41 is rotatably mounted in turn by means of a bearing 29 locked in said casing 17.

At the end of shaft 81 opposite the end supporting the bevel pinion 37, a cylindrical or spur pinion 44 is rigidly secured; this pinion 44 is in constant meshing engagement with another spur pinion 45 rigid with a shaft 46 centered and disposed coaxially by means of a pair of bearings 47 and 48 in a ring 49 locked in the casing 6 by means of screws 43. Thus, by construction, the shaft 46 is parallel to shaft 33 and moves along a circular path about this shaft 33 when the motor 2 is operating. This shaft 46 carries at its end a bevel pinion 50 in constant meshing engagement with a bevel pinion 51 rigid with a shaft 52 constituting the third axis of the robot head, this shaft 52 being journalled in the casing 6 by means of bearings 53 and 54, bearing 53 being held in position by a cover 64 rigid with said casing 6. It is thus clear that the operation of this head is attended by the rotation of shaft 52. This shaft 52 extends at right angles to the intermediate shafts 33 and 46, and carries the tool or device manipulated by the robot by means of an end disk 55, this tool or device consisting of, or being replaced by, a rigid arm supporting in turn a pair of pliers or tongs for performing the desired manipulation.

When motor 2 operates the shaft 33 rotates about its axis but shaft 52 is also rotated about its axis. Therefore, if it is desired to hold the shaft 52 is a predetermined fixed angular position with respect to the casing 6, the motor 3 must be actuated each time motor 2 is actuated.

The three motors 2, 3 and 4 carry at their rear ends position coding means 56, 57 and 58, respectively, adapted at the same time to deliver a tachometric signal for ancillary or servo-functions.

Figure 2:
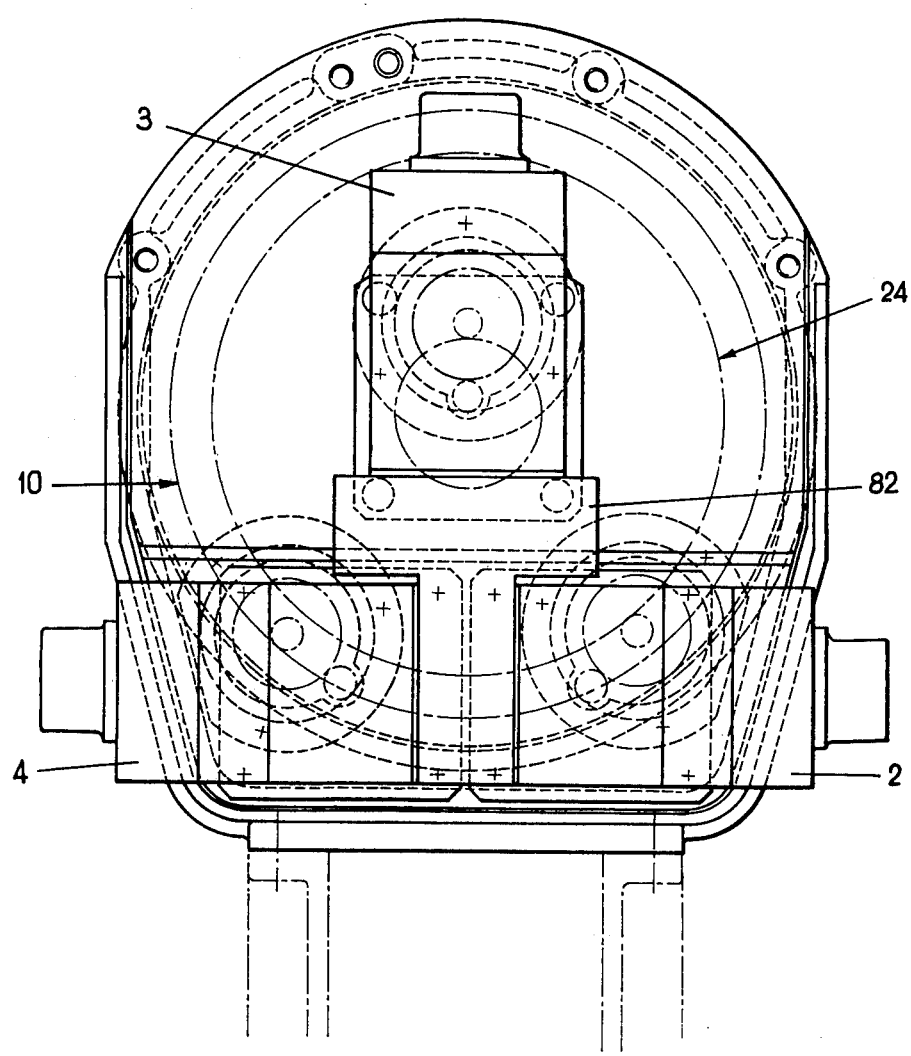
FIG. 2 is a plan view from above showing the robot or manipulator head of FIG. 1.

The compactness of the assembly is clearly evidenced by the above description and the attached figures 1 and 2. The very reduced lengths of transmission shafts 22, 27, 33, 81, 46 and 52 imparts a considerable rigidity thereto, in case of both flexion and torsion stresses, without requiring excessive diametral dimensions therefor. The low inertia of the kinematic chains, in conjunction with the fact that rotary servo motors are used, affords an easy, automatic control of the servo motors by using pulses emitted at a relatively high rate or frequency.

The assembly is made fluid-tight by means of suitable seals at points 59, 60, 61, 62 and 63. Thus, the head assembly can be lubricated without any difficulty, by using preferably grease, without any risk of leakage. Since the motors 2, 3 and 4 are mounted very close to each other, they can be supplied directly from a block whereby a single supply line and a single return line can be used, and besides it is not necessary to disconnect these lines when it is desired to replace a servo motor.

Each motor 2, 3 and 4 is secured by means of four screws on its front face. Centered in a bore, it drives directly through its output shaft 12 in which gear teeth are cut a two stage reduction gear 13 mounted on a bearing 15 having four contact points; however, the motor may be centered directly as a substitute for the bearing of this reduction gear in order to obtain a faster rotation of the three shafts. In the rear portion of each motor the corresponding coding unit is provided. The hydraulic fluid supply is through a T-shaped base plate 82 incorporating supply ports and outlet ports made fluid tight by suitable 0-rings.

Figure 3:
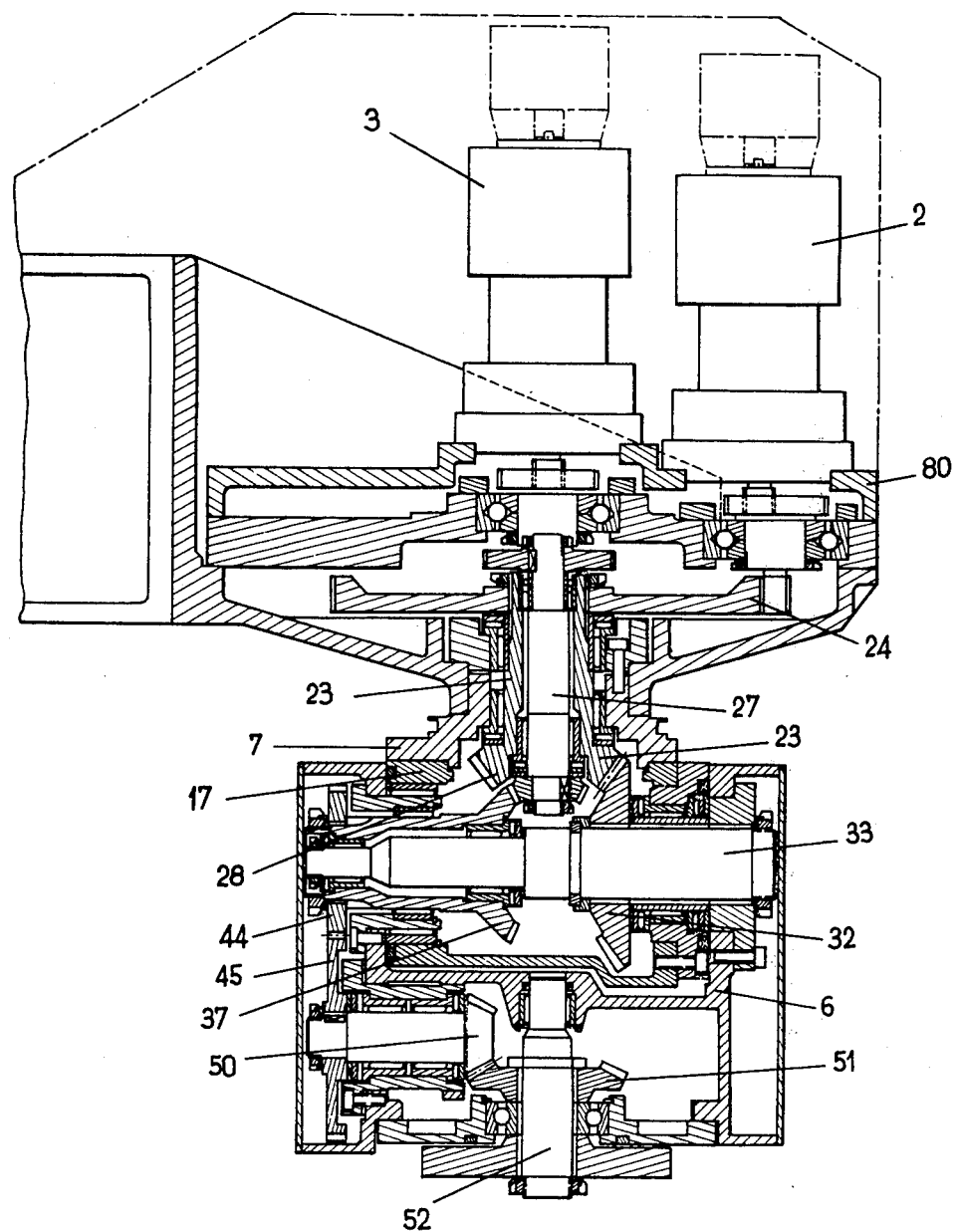
FIG. 3 is a section taken along the longitudinal centre line of a first form of embodiment of a two-axes robot or manipulator head derived from the construction of FIG. 1.

FIG. 3 illustrates a robot head similar to the one shown in FIG. 1, but from which one axis of rotation has been eliminated. The members 24, 7 and 22 are identical with those of the first form of embodiment. On the other hand, the third servo motor 4 is dispensed with together with its coding unit 58, the transmission system, the toothed annulus 10 and the bearing 5. The other components are no more complicated than if the head had been designed from the onset with a view to have only two axes materialized by shafts 33 and 52, the latter being also in this case the tool or apparatus holder.

Figure 4:
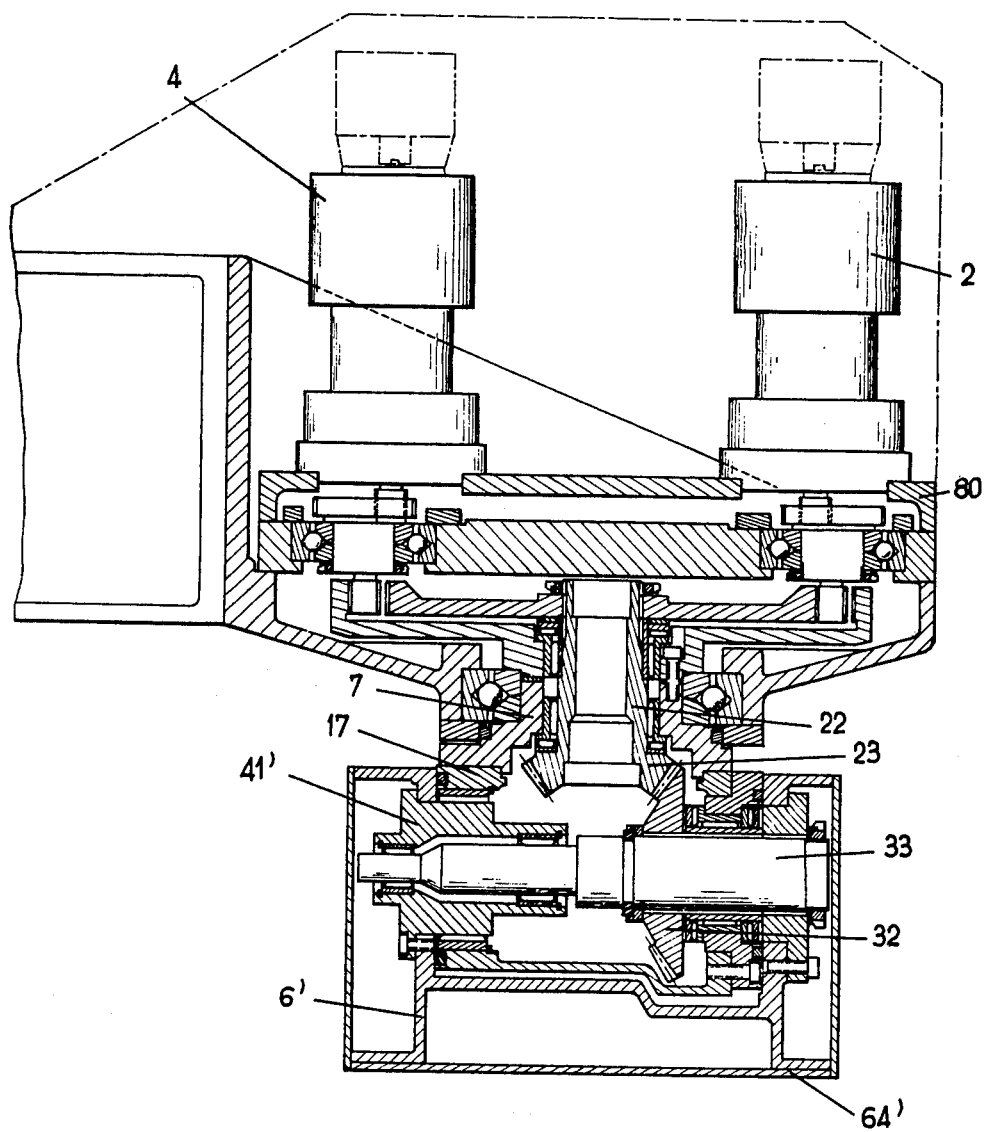
FIG. 4 is a section taken along the longitudinal center line of a second form of embodiment of a two-axis robot or manipulator head derived from the construction of FIG. 1.

FIG. 4 illustrates a modified form of embodiment of a two-axis robot head from which the third shaft 52 has been removed together with the complete transmission members leading thereto, namely: motor 3 and reduction gear 13; shaft 27, bevel pinions 28, 37, coaxial shaft 81; spur gear 44, 45; shaft 46; ring 49; bearings 47, 48, 53, 54; shaft 52, disk 55; bevel pinions 50 and 51. Also in this case, only elements are eliminated, but the casing 6 is advantageously replaced by a casing 6' of simpler design, provided with another ring 41' in order to eliminate useless and therefore expensive machining operations in the casing 6, although this is not compulsory, since this casing becomes the holder of the manipulating tools or apparatus.

What is claimed as new is:

1. Robot or manipulator head comprising a control casing and at least two perpendicular shafts and corresponding external members rotatably driven from driving servo motors, one of said perpendicular shafts being rigid with one of said members supporting the other perpendicular shaft, said servo motors fixedly mounted in said control casing being drivingly connected to at least two coaxial shafts, while at least one of said perpendicular shafts is driven from one of said coaxialshafts through a bevel gear of which the input pinion is rigid with said one coaxial shaft and the output pinion is rigid with said one perpendicular shaft.

2. Robot or manipulator head according to claim 1, wherein one of said two perpendicular shafts constitutes the external shaft of said coaxial shafts supporting the member in which the other perpendicular shaft is rotatably mounted.

3. Robot or manipulator head according to claim 1, wherein said two coaxial shafts carry each an input pinion of a bevel gear, the output pinions of these two bevel gears being coaxial to each other, one of said output pinions being rigid with said member supporting the other perpendicular shaft, the other output pinion of the other bevel gear being operatively connected in parallel to a third bevel gear incorporated in said supporting member comprising the other perpendicular shaft carrying in turn the output pinion of said third bevel gear.

4. Robot or manipulator head according to claim 1, comprising three perpendicular shafts, one of which consists of the outermost one of three coaxial shafts driven from said servo motors, said outermost shaft carrying the member in which the second perpendicular shaft is rotatably mounted, the other two inner coaxial shafts carrying each an input pinion of a bevel gear, the output pinion of said bevel gears being rigid with said second or intermediate coaxial shaft rigid with a member supporting the third shaft, the other output pinion of the other bevel gear of the pair of bevel gears being connected in parallel to a third bevel gear incorporated in said member supporting the third shaft, said third shaft carrying the output pinion of said third bevel gear.

5. Robot or manipulator head according to claim 1, wherein said coaxial shafts are provided with integral concentric toothed portions in constant meshing engagement with driving pinions driven from said servo motors.

6. Robot or manipulator head according to claim 1, wherein said servo motors are mounted on a common plate incorporated in said casing.

7. Robot or manipulator head according to claim 5, wherein said servo motors carry position coding units at their ends opposite that from which said driving pinions are driven.

* * * * *